UNITED STATES PATENT OFFICE.

JAMES R. BRADLEY AND MOSES D. BROWN, OF CHICAGO, ILLINOIS.

IMPROVEMENT IN THE MANUFACTURE OF STEEL.

Specification forming part of Letters Patent No. 72,162, dated December 17, 1867.

*To all whom it may concern:*

Be it known that we, JAMES R. BRADLEY and MOSES D. BROWN, of Chicago, Cook county, Illinois, have invented a new and useful Improvement in the Manufacture of Steel; and we do hereby declare that the following is a full, clear, and exact description thereof, which will enable others skilled in the art to make and use the same.

This invention relates to an improved process for manufacturing steel of various kinds and grades; and consists in improvements in the composition of mixtures for treating malleable iron produced by a method for which a patent was issued to James R. Bradley, dated April 15, 1862, No. 34,937, for the manufacture of malleable iron and steel, and also for treating scrap-iron and malleable iron otherwise manufactured, which said improvements are hereinafter minutely described.

For producing steel of superior quality from malleable iron manufactured according to the method of the said Bradley, under the patent aforesaid, instead of mixing with the melted malleable iron the several ingredients, as described in said patent, for converting it into steel, add to the melted iron the following ingredients, united in their several proportions, and finish the boiling process as described in said patent, to wit: Chloride of sodium, four pounds, or thereabout; binoxide of manganese, two ounces, or thereabout; saltpeter, six ounces; alum, five ounces; charcoal, eight ounces; sal-ammoniac, five ounces; and when gray cast-iron has been used, add also dry potash, two and one-half ounces.

For treating scrap-iron or malleable iron of good quality produced by the ordinary processes, and producing therefrom different kinds of steel, we melt the scrap or malleable iron in crucibles, adding thereto chemical ingredients of different properties, and in different proportions, as follows, to wit: To make shear-steel, to a pot of fifty pounds, add potash, one and one-quarter ounce; sal-ammoniac, one and one-half ounce; manganese, four and one-quarter ounces; charcoal, seven ounces; sodium, three ounces. To make cast-steel, to a pot of fifty pounds, add potash, one and one-half ounce; sal-ammoniac, one and one-half ounce; manganese, four and one-quarter ounces; rock-salt, three and one-quarter ounces; charcoal, seven ounces. To make German steel, to a pot of fifty pounds, add potash, one and one-half ounce; sal-ammoniac, one and one-half ounce; manganese, four and one-half ounces; charcoal, seven ounces. To make Damascus steel, to a pot of fifty pounds, add potash, one and three-quarter ounce; sal-ammoniac, one and three-quarter ounce; manganese, five ounces; saltpeter, four ounces; charcoal, seven ounces. To make saw-steel, to a pot of fifty pounds, add potash, one and one-quarter ounce; sal-ammoniac, one and one-half ounce; manganese, four and one-half ounces; charcoal, eight and one-half ounces; common salt, three and one-half ounces; saltpeter, one ounce. To make silver-steel, to a pot of fifty pounds, add potash, one and one-half ounce; sal-ammoniac, one and three-quarter ounce; manganese, four and three-quarter ounces; charcoal, eight ounces; salt, three and one-half ounces; alum, one ounce. To make file-steel, to a pot of fifty pounds, add potash, one ounce; sal-ammoniac, three-quarters of an ounce; manganese, four ounces; charcoal, nine ounces; salt, three and one-half ounces; alum, one-quarter ounce. To make rifle-steel, to a pot of fifty pounds, add potash, three-quarters of an ounce; manganese, four ounces; charcoal, three and one-half ounces; salt, three ounces; alum.

Having thus described our invention, what we claim as new, and desire to secure by Letters Patent, is—

The improved processes for making steel of different kinds herein described, by mixing the several ingredients in the proportions, and melting the same with malleable or scrap iron, as specified.

The above specification of our invention signed by us this 5th day of September, 1867.

JAS. R. BRADLEY.
MOSES D. BROWN.

Witnesses:
THOS. M. THOMPSON,
THOS. O. OSBORN.